United States Patent [19]

Liedloff

[11] Patent Number: 5,917,004
[45] Date of Patent: Jun. 29, 1999

[54] WEATHER-RESISTANT POLYAMIDES AND METHOD OF THEIR PRODUCTION

[75] Inventor: Hanns-Jörg Liedloff, Domat/Ems, Switzerland

[73] Assignee: EMS-Inventa AG, Zurich, Switzerland

[21] Appl. No.: 08/890,483

[22] Filed: Jul. 9, 1997

[30]  Foreign Application Priority Data

Jul. 9, 1996 [DE] Germany .......................... 196 27 629
May 27, 1997 [DE] Germany .......................... 197 22 135

[51] Int. Cl.$^6$ .......................... C08G 69/08; C08G 73/00
[52] U.S. Cl. .......................... 528/332; 528/310; 528/322; 528/327; 528/331; 528/335; 528/336; 528/341; 528/349; 524/100; 524/154
[58] Field of Search .......................... 528/332, 331, 528/335, 336, 327, 322, 310, 349, 341; 524/100, 154

[56]  References Cited

U.S. PATENT DOCUMENTS 4,333,868  6/1982  Schmidt et al. .......................... 524/152

FOREIGN PATENT DOCUMENTS

| 0 080 431 A2 | 10/1982 | European Pat. Off. . |
| 0 345 648 B1 | 6/1989 | European Pat. Off. . |
| 1 558 350 | 1/1969 | France . |
| 2 237 849 | 8/1972 | Germany . |
| 19 19 021 B2 | 12/1979 | Germany . |
| 44 13 177 A1 | 10/1995 | Germany . |
| 44 29 089 A1 | 2/1996 | Germany . |
| 4-159327 | 6/1992 | Japan . |

*Primary Examiner*—P. Hampton-Hightower
*Attorney, Agent, or Firm*—Hardaway Law Firm, P.A.

[57]  ABSTRACT

The invention is relative to weather-resistant polyamides and to methods of their production in which the polymerization or polycondensation of the polyamide-forming monomers (I) is carried out in the presence of 0.02 to 0.7% by weight 4-amino-2,2,6,6-tetraalkylpiperdine (II), 0 to 0.5% by weight of an aliphatic or cycloaliphatic diamine (III) carrying a primary and a tertiary amino group and 0.02 to 0.7% by weight of a 2,6-dialkylphenol (IV) functionalized in 4-position to the OH group and with the formula

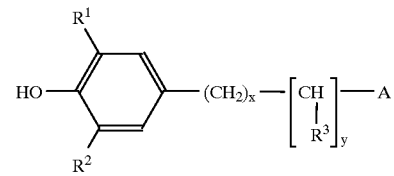

in which $R^1$ and $R^2$ are the same or different alkyl groups with 1 to 6 C atoms, $R^3$ is either a hydrogen atom or a methyl group, functional group A represents either a free carboxyl group or a carboxyl group esterified with $C_1$–$C_4$ alcohols or represents a primary amino group, in the case of the amino group the value combinations (x=2/y=1); (x=2/y=0); (x=1/y=0) and (x=0/y=1) are possible for x and y and in the case of the free or esterified carboxyl group x and y can additionally each be 0, and in which the amounts of components I to IV supplement each other to 100% by weight, the sum of components II, III and IV is 0.05 –1.3% by weight and components II, III and IV are bound via amide bonds to the polymer chains.

The invention is furthermore relative to weather-resistant polyamides accessible from lactams, ω-amino carboxylic acids and consisting of the previously cited components I, II, III, optionally IV and 0.1 to 1.2% by weight of a tri-, tetra- or polycarboxylic acid V as well as to a method of their production in which the amounts of components I to V supplement each other to 100% by weight, the sum of components II, III, IV and V is 0.2–2.5 % by weight and components II, III, IV and V are bound via amide bonds to the polymer chains.

18 Claims, No Drawings

WEATHER-RESISTANT POLYAMIDES AND METHOD OF THEIR PRODUCTION

FIELD OF THE INVENTION

The invention is relative to the subject matter indicated in the patent claims.

The invention is relative in particular to a method of producing polyamides by polymerization or polycondensation of polyamide-forming monomers (I) in the presence of components II, III, IV and V specified below in more detail, moreover to weather-resistant polyamides accessible from I, II, III, IV and V in which polyamides components II, III, IV, V are bound via amide bonds to the polymer chain, as well as to the use of these polyamides to produce injection-molded or extruded parts, to produce threads, fibers or foils or to produce hot-melt powders or hot-melt fibers.

BACKGROUND OF THE INVENTION

The weather resistance of polyamides, that is, their resistance to the simultaneous or alternating action of UV radiation and elevated temperatures in the presence of oxygen and moisture, is insufficient for a number of applications. With the exception of the so-called completely aromatic polyamides (e.g. Kevlar®), this deficiency concerns practically all known polyamides, the homopolyamides PA-6, PA-66, PA-12, PA-1i, PA-69, PA-6.10 etc. just as well as the copolyamides accessible from any aliphatic monomer combinations. However, this also affects the partially crystalline or amorphous, partially aromatic polyamides derived from aromatic dicarboxylic acids, aliphatic and/or cycloaliphatic diamines or the corresponding salts and, if applicable, from any other polyamide-forming monomers.

It has long been common practice in the polymerization or polycondensation of polyamides to use amines, mono- or dicarboxylic acids as chain terminators; usually, carboxylic acids such as e.g. acetic acid, benzoic acid or adipic acid are used for this purpose. However, other aliphatic or cycloaliphatic diamines are also used if it is a matter, for example, of improving the adhesion of a polyamide to carboxyl- or carboxylic-acid anhydride-functional polymers. The amine termination can be used with success on polymer mixtures, e.g. blends of PA-6 or PA-12 with anhydride-functional poly(2,6-dimethylphenylene oxide) or on polymer compounds [composites], e.g., multi-layer pipes or multi-layer foils. Further effects can be achieved by the type and amount of the chain terminator which go beyond a pure control of the reaction rate during the polymerization or polycondensation and of the molecular weight or degree of polymerization of the particular polyamide to be achieved thereby. Thus, calculations have shown in conjunction with the hydrolytic polymerization of laurinlactam that the molecular weight distribution MW/MN of the PA-12 depends on the functionality and the amount of the chain terminator and on the conversion of the polymerization (see "Angewandte Makromolekulare Chemie 34" (1973), pp. 135–152 and 153–163). The authors demonstrate, among other things, that closer distributions molecular weight distributions result from the use of a difunctional chain transfer agent such as e.g. adipic acid in all chain terminator concentrations and conversions relevant for the practice than in the case of a monofunctional termination or in the case of uncontrolled PA-12. These findings should also be at least qualitatively transferable to other polyamides, e.g. PA-6. The results of the cited works can have considerable practical significance since it is known that the processability of a polyamide is influenced by its molecular weight distribution. Experience teaches that especially in the spinning of polyamides, primarily PA 6 and PA-66, comparatively close molecular weight distributions are advantageous as concerns the capability of being spun (spinning speed and spinning safety) and the fiber properties (strength and uniformity).

In addition to the "typical" chain transfer agents cited above (benzoic acid, acetic acid, adipic acid) there are other substances which act as chain terminators and are suitable on account of their special molecular structure for improving the thermal stability and, if applicable, photostability of polyamides. These substances include, for the one, carboxyl- and ester- or amine-functionalized, sterically hindered phenols in which the phenolic OH group is sterically shielded by one or two voluminous alkyl groups, e.g. 3,5-di-t-butyl-4-hydroxybenzoic acid, 3-(3,5-di-t-butyl-4-hydroxyphenyl)-propionic acid or 3-(3,5-di-t-butyl-4-hydroxyphenyl)-1-aminopropane. For the other, they include 4-amino-2,2,6,6-tetraalkylpiperidines which can be further substituted on the N atom of the piperidine ring, e.g. 4-amino-2,2,6,6-tetramethylpiperidine, 1called triacetone diamine for short, or 4-amino-1-alkyl-2,2,6,6-tetramethylpiperidine with $C_1$–$C_{18}$ alkyl groups or with a benzyl group in position 1.

DISCUSSION OF RELATED ART

The simultaneous utilizing of sterically hindered phenols of the above-described structure for chain control or chain termination and thermal stabilization of polyamides is described in FR patent 1,558,350, DE-OS 2,237,849 and in JP 4,159,327. FR patent 1 558,350 combines the sterically hindered phenols with pentavalent phosphorus compounds. As follows from the examples, the FR patent aims primarily therewith at the thermal stabilization of polyamide fibers and at the improving of the color fastness of anionically dyed fibers under thermo-oxidative stress. The FR patent does also speak of the resistance to the degrading action of light in the introduction; however, the effectiveness of the individual stabilizer combinations against the oxidative degradation of polyamides induced by light and of the exclusively used PA-66 is not experimentally documented. In order to test their thermal- and color stability, dyed PA-66 fibers are briefly exposed to a high temperature. The decrease of the amino terminal group concentration and the diminution of color intensity occurring thereby are measured.

DE 1,919,021 describes the use of special phenolic acids as well as of phosphoric acid and/or phosphorous acid in the hydrolytic polymerization of laurinlactam. DE 1,919,021 concerns the improvement of the resistance of polylaurinlactam to the action of heat, light and oxygen. The phenol carboxylic acids used as stabilizer are obviously condensed in at the ends of the polyamide chains.

DE-OS 2,237,849 provides the use of amine salts of 3,5-dialkyl-4-hydroxyphenylcarboxylic acids in order to improve the thermal and oxidative stability of polyamide compositions. The amine salts concerned can be introduced into the polyamide before, during and after the polycondensation step. It is assumed thereby that these amine salts act as chain terminators upon the addition before or during the polycondensation (or polymerization, if lactams are used as monomers). The retention of the specific viscosity of the stabilized polyamides and their color fastness during an oven aging test are taken as measure for the effectiveness of the amine salts used.

In JP 4,159,327 polyamide-12 hydrolytically polymerized from laurinlactam in the presence of e.g. 3,5-di-t-butyl-4-hydroxybenzoic acid is described which is distinguished over unmodified PA-12 by an improved resistance to oil and to "sour-gasoline". It must also be assumed here that the sterically hindered phenolic acid acts as chain terminator and is bound in the form of corresponding terminal groups to the polymer chains.

EP 008431 A2 concerns synergistic mixtures of low-molecular and high-molecular polyakylpiperdines. These mixtures have a synergistic effect and can be added to various plastics and can in particular be mixed in in the melt.

Since these mixing processes are concluded after a few minutes (approximately 1–3 min) and the residence time of the cited piperidine derivatives in the melt is correspondingly short, it can be assumed that primarily physical mixtures are involved.

The 4-amino-2,2,6,6-tetraalkylpiperidines which can be substituted on the N atom of the piperidine ring constitute subject matter of DE-OS 44 13 177 and of DE-OS 44 29 089. They likewise assume the double function of thermal stabilizers and chain terminators in the "inherently thermo-stablized polyamides" specified there. The stabilization method should be applicable to any aliphatic and partially aromatic polyamides or copolyamides, according to these DE-OS'es; however, it is exemplified only on stabilized polyamide-6 types for spinning purposes.

EP 345,648 B1 (Ems-Inventa AG) is relative to branched, thermoplastically processable polyamides obtainable by the hydrolytic polymerization of ω-amino carboxylic acids and/or lactams. The amount of polymer molecules which have more than one branching thereby is at least 50% by weight, which is achieved in that components of the types polycarboxylic acid and polyamine with a branching action are added to the melt of the base monomers in a strictly defined molar ratio. These polyamides can be produced batchwise over rather long time periods with good reproducibility and quality and have high resistance to flow. EP 0,345,648 B1 also describes that 4-amino-2,2,6,6-tetraalkylpiperidines can be mixed into the melt of the base monomers so that these compounds can be inserted at the ends of the polymer chains. According to EP 0,345,648 B1 4-amino-2,2,6,6-tetraalkylpiperidine is used with particular preference.

All the methods described above for the thermostabilization of polyamides and the thermostabilized polyamides accessible therefrom have the undeniable advantage that the addition of the components with a stabilizing action already before or during the polymer production results in products which are ready for processing and to which no more stabilizers need be mixed in. Moreover, stabilizer losses due to migration, evaporation or extraction are prevented with the bonding of the stabilizer molecule groups to the polymer chains. In this manner the maximum possible effectiveness of the stabilizers in the production, processing and use of the polyamides is assured.

The permanent anchoring of stabilizer molecules to the chain ends becomes a disadvantage, however, if it is a matter of making available polyamides with an especially high ability to resist the influences of weather, that is, the simultaneous or chronologically staggered action of UV radiation, elevated temperatures and moisture. In order to maintain the photo- and thermooxidative degradation of polyamides within limits for longer time periods in outdoor applications in which they are exposed to said polymer-damaging influences, relatively large amounts of stabilizers must inevitably be added. In the instance of polymer-bound stabilizers like those which were described above this results automatically in a corresponding increase of the chain termination. However, as the chain termination increases the molecular weight achievable in the polymerization and/or polycondensation of the polyamide in question and, parallel thereto, the viscosity are reduced more and more. The polymer-bound stabilizers of the state of the art therefore reach the limits of their applicability, where the requirements on the molecular properties of the polyamide concerned, that is, on its molecular weight and also on its terminal-group balance and its weather resistance can no longer be met with the one or the other of the cited stabilizers. The limits of the applicability are reached, e.g., if in the case of a polyamide specified at average to high viscosity the amount of stabilizer must be reduced to such an extent that the required weather resistance is no longer reached.

SUMMARY OF THE INVENTION

The invention therefore has the problem of making available novel weather-resistant polyamides and a method of their production. A polymer-bound stabilizer system should be created thereby which develops at least the same or a higher effectiveness than the stabilizers of the state of the art at the same amount of stabilizer and which permits therewith the above-indicated limits to be shifted in a positive sense as concerns the weather resistance and the molecular properties of polyamides.

This problem is solved by the method in accordance with claims 1 and 2 and by the polyamides in accordance with claims 12 and 13 by means of the use according to claim 15.

DETAILED DESCRIPTION OF THE INVENTION

Surprisingly, the solution of this problem was achieved according to an embodiment by the addition prior to the start or during the polymerization or polycondensation of a 4-amino-2,2,6,6-tetraalkylpiperidine (II) and of a 2,6-dialkylphenol (IV) of the following formula functionalized in 4-position to the OH group:

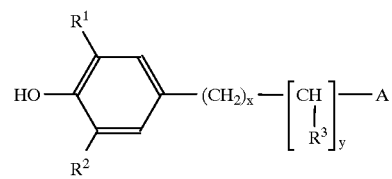

Here, $R^1$ and $R^2$ signify the same or different alkyl groups with 1 to 6 C atoms, $R^3$ is either a hydrogen atom or a methyl group. Functional group A represents either a free carboxyl group or one esterified with $C_1$–$C_4$ alcohols or represents a primary amino group and in the case of the amino group the value combinations (x=2/y=1); (x=2/y=0); (x=1/y=0) and (x=0/y=1) are possible for x and y and in the case of the free or esterified carboxyl group x and y can additionally each be 0. Furthermore, in addition to stabilizer components II and IV an aliphatic or cycloaliphatic diamine (III), which carries a primary and a tertiary amino group, can be added.

The invention is accordingly relative to a method of producing polyamides in which the polymerization or polycondensation of polyamide-forming monomers (I) is carried out in the presence of 0.02 to 0.7% by weight 4-amino-2,2,6,6-tetraalkylpiperdine (II), 0 to 0.5% by weight of an aliphatic or cycloaliphatic diamine (III) carrying a primary and a tertiary amino group and 0.02 to 0.7% by weight of a 2,6-dialkylphenol (IV) functionalized in 4-position to the OH group and with the formula

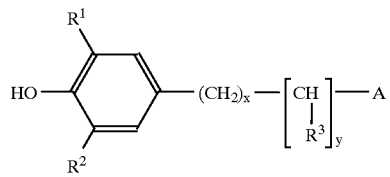

in which $R^1$ and $R^2$ are the same or different alkyl groups with 1 to 6 C atoms, $R^3$ is either a hydrogen atom or a methyl group, functional group A represents either a free carboxyl group or a carboxyl group esterified with $C_1$–$C_4$ alcohols or represents a primary amino group, in the case of the amino group the value combinations (x=2/y=1); (x=2/y=0); (x=1/y=0) and (x=0/y=1) are possible for x and y and in the case of the free or esterified carboxyl group x and y can additionally each be 0, and in which the amounts of components I to IV supplement each other to 100% by weight, the sum of components II, III and IV is 0.05–1.3% by weight and components II, III and IV are bound via amide bonds to the polymer chains.

In another embodiment the invention is relative to a method of producing weather-resistant polyamides accessible from lactams, ω-amino carboxylic acids, in which the polycondensation of the polyamide-forming monomers (I) is carried out in the presence of 0.02 to 0.7% by weight 4-amino-2,2,6,6-tetraalkylpiperdine (II), 0 to 0.5% by weight of an aliphatic or cycloaliphatic diamine (III) carrying a primary and a tertiary amino group, and optionally 0.02 to 0.7% by weight of a 2,6-dialkylphenot (IV) functionalized in 4-position to the OH group and with the formula

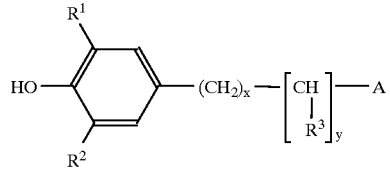

in which $R^1$ and $R^2$ are the same or different alkyl groups with 1 to 6 C atoms, $R^3$ is either a hydrogen atom or a methyl group, functional group A represents either a free carboxyl group or a carboxyl group esterified with $C_1$–$C_4$ alcohols or represents a primary amino group, in the case of the amino group the value combinations (x=2/y=1); (x=2/y=0); (x=1/y=0) and (x=0/y=1) are possible for x and y and in the case of the free or esterified carboxyl group x and y can additionally each be 0,
and 0.1 to 1.2% by weight of a tri-, tetra- or polycarboxylic acid (V), and in which the amounts of components I to V supplement each other to 100% by weight, the sum of components II, III, IV and V is 0.2–2.5% by weight and components II, III, IV and V are bound via amide bonds to the polymer chains.

Preferred embodiments of the method of the invention are described in subclaims 2–15.

Furthermore, the invention is relative to weather-resistant polyamides which are characterized in that they are essentially accessible from and built up from the particular polyamide-forming monomers (I), 0.02 to 0.7% by weight 4-amino-2,2,6,6-tetraalkylpiperdine (II), with 4-amino-2,2,6,6-tetramethylpiperidine being preferred, 0 to 0.5% by weight of an aliphatic or cycloaliphatic diamine (III) carrying a primary and a tertiary amino group and 0.02 to 0.7% by weight of a 2,6-dialkylphenol (IV) functionalized in 4-position to the OH group and with the formula

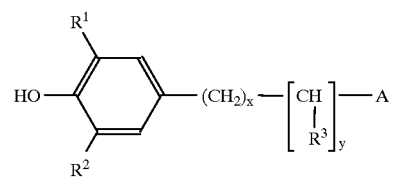

in which $R^1$ and $R^2$ are the same or different alkyl groups with 1 to 6 C atoms, $R^3$ is either a hydrogen atom or a methyl group, functional group A represents either a free carboxyl group or a carboxyl group esterified with $C_1$–$C_4$ alcohols or represents a primary amino group, in the case of the amino group the value combinations (x=2/y=1); (x=2/y=0); (x=1/y=0) and (x=0/y=1) are possible for x and y and in the case of the free or esterified carboxyl group x and y can additionally each be 0, and that the amounts of components I to IV supplement each other to 100% by weight, the sum of components II, III and IV is 0.05–1.3 % by weight and components II, III and IV are bound via amide bonds to the polymer chains.

The invention is further relative to weather-resistant polyamides of lactams and ω-amino carboxylic acids which are characterized in that they are built up essentially from the particular polyamide-forming monomers (I)

0.02 to 0.7% by weight 4-amino-2,2,6,6-tetraalkylpiperdine (II), 0 to 0.5% by weight of an aliphatic or cycloaliphatic diamine (III) carrying a primary and a tertiary amino group and optionally 0.02 to 0.7% by weight of a 2,6-dialkylphenol (IV) functionalized in 4-position to the OH group and with the formula

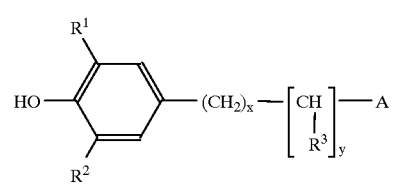

in which $R^1$ and $R^2$ are the same or different alkyl groups with 1 to 6 C atoms, $R^3$ is either a hydrogen atom or a methyl group, functional group A represents either a free carboxyl group or a carboxyl group esterified with $C_1$–$C_4$ alcohols or represents a primary amino group, in the case of the amino group the value combinations (x=2/y=1); (x=2/y=0); (x=1/y=0) and (x=0/y=1) are possible for x and y and in the case of the free or esterified carboxyl group x and y can additionally each be 0, and 0.1 to 1.2% by weight of a tri-, tetra- or polycarboxylic acid (V), and that the amounts of components I to V supplement each other to 100% by weight, the sum of components II, III, IV and V is 0.2–2.5% by weight and components II, III, IV and V are bound via amide bonds to the polymer chains.

If a polyfunctional, e.g. trifunctional carboxylic acid is added in accordance with a special embodiment of the invention to the melt of the base monomers of pure amino acid (and/or lactam), then a polymer molecule grows in three defined directions which always carries the COOH group on its chain end. Since COOH groups do not react with each other under customary condensation conditions, no cross-linking can occur.

If copolyamides are produced from e.g. 6-lactam as well as ω-amino undecane and ω-amino dodecanoic acid using the chain terminating agents of the invention as well as with the addition of a trifunctional carboxylic acid such as e.g. nitrilotriacetic acid, nitrilotriproprionic acid or trimethylnitrilotripropionic acid, their melting point can be given by the mixing ratio of the base monomers by means of the systematic selection of the termination system, the type and concentration of the terminal groups. The adhesion to various substances can be systematically adapted to the requirements of practice therewith by means of the possible high concentration of functional terminal groups.

The above-mentioned trifunctional compound must therefore always have three functional groups of the same type. It should be readily soluble in the melt of the monomers and be able to be brought in solution by salt formation. Suitable tri- or tetrafunctional carboxylic acids are nitrilotriacetic acid, ethylene diamine tetraacetic acid, trimesic acid.

Nitrilotripropionic acid or trimethylnitrilotripropionic acid can also be used in an analogous manner. Especially preferred tricarboxylic acids are nitrilotriacetic acid and the nitrilotripropionic acids of the following formula:

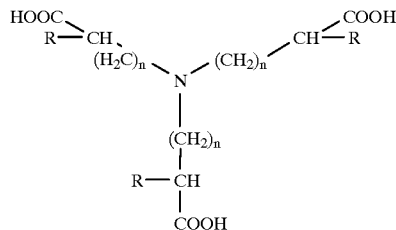

R = H; n = 0: Nitrilotriacetic acid
R = H; n = 1: Nitrilotripropionic acid
R = $CH_3$; n = 1: Trimethylnitrilotripropionic acid.

Finally, the invention is relative to the use of the weather-resistant polyamides to produce injection-molded or extruded parts, to produce threads, fibers or foils or to produce hot-melt powders or hot-melt fibers.

The cooperation of the two different stabilizer molecule groups, which are polymer-bound and therefore limited in their mobility, is novel and, measured against the state of the art, totally unexpected as it is surprisingly favorable in regard to the weather resistance, that is, it goes beyond a pure addition of the individual effects.

In addition to components II and IV functioning as stabilizers and at the same time as chain terminators another chain transfer agent can be used with diamine component III. However, no effect on the weather resistance can be ascribed to this component, which is apparent from one of the examples. Thus, diamine component III has the sole function of a chain terminator and serves in particular to adjust the total amount of aminic terminal groups of the particular polyamide to the values required for the particular application. The use of diamine component III is logical e.g. in the case of polyamide-6 fibers, which are usually dyed with dyes exhibiting a high affinity for the basic centers on the polymer molecules. Diamine component III is preferably selected from the group consisting of 3-(dialkylamino)-1-propylamine, 2-(dialkylamino)-1-ethylamine, piperidino- and pyrrolidinoalkylamines and is used in an amount of preferably 0–0.4% by weight.

Of course, the known chain terminators initially cited can also be used concurrently in amounts corresponding to the particular guidelines regarding the molecular weight and the terminal-group concentrations of the polyamide. These additional chain transfer agents comprise aromatic di- and monocarboxylic acids—preferably terephthalic acid, isophthalic acid and benzoic acid—, aliphatic or cycloaliphatic di- and monocarboxylic acids—preferably adipic acid, sebacic acid, acetic- and propionic acid as well as cyclohexane-1,4-dicarboxylic acid as well as monoamines and diamines with two primary amino groups.

If the tricarboxylic acids with branching action are used as chain transfer agents instead of dicarboxylic acids this preferably involves one of the nitrilotricarboxylic acids previously defined.

The method of the invention for producing weather-resistant polyamides can be used with any aliphatic or partially aromatic polyamides or copolyamides accessible from polyamide-forming monomers (I), that is, from lactams, ω-amino carboxylic acids, dicarboxylic acids and diamines, dicarboxylic acid/diamine salts.

The lactams preferably contain 6–12 carbon atoms, with caprolactam and laurinlactam being especially preferred. Of the ω-amino carboxylic acids, which contain 6–12 carbon atoms, ε-amino caproic acid and ω-amino lauric acid are especially preferred.

Straight-chain or branched aliphatic or cycloaliphatic dicarboxylic acids with 6–36 carbon atoms can be just as well used as substituted or non-substituted aromatic dicarboxylic acids with 8–18 carbon atoms. Of the two subgroups of dicarboxylic acids adipic acid, azelaic acid, sebacic acid, docecanedioic acid, the trimethyl adipic acids, cis-and/or trans-cyclohexane-1,4-dicarboxylic acid and dimerized fatty acids (e.g. the pripol types of the UNICHEMA company) and terephthalic acid, isophthalic acid and naphthalene-1,6-dicarboxylic acid are especially preferred.

Straight-chain or branched aliphatic diamines with 4–13 carbon atoms and two primary amino groups, cycloaliphatic diamines with 6–26 carbon atoms and two primary amino groups and araliphatic diamines (aromatic/aliphatic) with 8–26 carbon atoms and two primary amino groups linked to aliphatic C atoms can be used as diamines.

Of the three subgroups of diamines hexamethylene diamine (1,6-diaminohexane), 1,10-diaminodecane, 1,12-diaminododecane, 1,4-diaminobutane, 2,2,4-and/or 2,4,4-trimethyl-1,6-diaminohexane and cis- and/or trans-1,4-diaminocyclohexane, cis- and/or trans-1,4-bis (aminomethyl)-cyclohexane, 3-amino-3,5,5-trimethylcyclohexylamine, the isomeric bis-(4-amino-3-methylcyclohexyi)methanes and the isomeric 2,2-bis(4-aminocyclohexyl)propanes and 1,3 and 1,4-bis-(aminomethyl)benzene are especially preferred.

The dicarboxylic acid/diamine salts used include the salts obtainable by the reaction of approximately stoichiometric amounts of the cited dicarboxylic acids and diamines. The hexamethylene diammonium adipate accessible from hexamethylene diamine and adipic acid is especially preferred. All other possible salts are usually produced immediately before the polycondensation in aqueous solution from the dicarboxylic acid(s) concerned and the diamine(s) concerned and are added in this form into the polycondensation. Furthermore, the diamines used include as fourth subgroup the diamino-poly(oxyalkylenes) with terminal primary amino groups. Especially preferred VIA polyetherdiamines are α,ω-diamino-poly(oxy-1,2-propylene), α, ω-diamino-poly(oxy-1,3-propylene), α,ω-bis(3-aminopropyl)-poly(oxy-1,3-propylene) and α,ω-bis(3-aminopropyl)-poly(oxy-1,4-butylene).

A large number of homopolyamides, copolyamides and block copolyamides can be built up from the polyamide-forming monomers (I) previously cited. The homopolyamides on which the method of the invention for producing weather resistance is preferably used include polyamide-6, -11, -12, -66, -69, -610, -6.12

6I(I stands for isophthalamide units) and

MXDA.6 (MXDA stands for meta-xylylene diamine and 1,3-bis-(aminomethyl)benzene).

The copolyamides and block copolyamides correspondingly include the following products: CoPA-6/12, -6/66, -66/12, -6/66/12, -6/69, -6/610, -66/610 as well as further ternary and quaternary copolyamides from these monomers, CoPA-6T/6 I with less than 40 molar % hexamethylene terephthalamide (6T) units, the copolyamides built up from laurinlactam or ω-aminolauric acid, isophthalic acid and/or terephthalic acid as well as from the isomeric bis-(4-amino-3-methylcyclohexyl)-methanes or 2,2-bis-(4-aminocyclohexyl)-propanes, the copolyamide from dodecanedioic acid and from the isomeric bis-(4-amino-3-methylcyclohexyl)-methanes, and also include the block copolyether amides built up from caprolactam or laurinlactam, dicarboxylic acids and α, ω-diaminopoly(oxy-1,2-propylene).

The weather-resistant polyamides in accordance with the invention and accessible in accordance with the method of the invention can basically be produced in reactors operating in batch or continuous mode by polymerization or polycondensation. The method of the invention differs from the numerous known methods of the state of the art in that two or three other raw materials can be introduced in relatively small amounts at a suitable position into the particular manufacturing process with components II, IV and optionally III. The addition of these components poses absolutely no problems in most instances and can take place concurrently with, successively after, before or during the polymerization or polycondensation.

The weather-resistant polyamides of the invention can be further modified in various ways, depending on their use. Thus, the addition of reinforcing agents and fillers such as glass fibers, carbon fibers, minerals and other modifying agents, e.g. flame-retarding additives, lubricants or mold release agents is common practice for the polyamides converted by injection molding, multi-component injection molding, injection molding welding, extrusion, coextrusion, blow molding, deep drawing and comparable processing methods to the corresponding form parts. If a processing of the polyamides to fibers o filaments is intended, which concerns primarily polyamide-6 and -66, the customary dulling agents based on titanium dioxide can be added preferably before or during the polymerization or polycondensation.

EXAMPLES

The following examples explain the invention.

The examples and reference examples contain exclusively polyamide-6 of low to medium viscosity, which is primarily suitable for the manufacture of fibers and of injection molded parts.

The weather-resistant polyamide-6 stabilized in accordance with the method of the invention and the polyamide-6 types of the state of the art cited by way of comparison were polymerized batchwise in a 130 l agitated autoclave. To this end 45 kg liquid caprolactam was mixed in each instance at 90° C. together with 7 l water and the amounts of the other components indicated in table 1 in an agitatable receiver rendered inert with nitrogen and the homogeneous mixture subsequently transferred into said autoclave and polymerized there under inert conditions ($N_2$). Approximately the following conditions were observed in a unified fashion during the polymerization:

Stage 1 (pressure phase):

Mass temperature: 270° C.

Pressure: 19 bar

Time: 3 hours

Stage 2 (expansion):

Mass temperature: from 270 to 260° C.

Pressure: from 19 to 1 bar

Time: 1.5 hours

Stage 3 (Degassing):

Mass temperature: 260° C.

Pressure: 1 bar

Time: approximately 5 hours.

When the desired viscosity had been reached the individual batches were pressed off as polymer strands, granulated after passing through a water bath, extracted with water and dried. The torque display of the agitator mechanism of the autoclave was taken as the base measure for the viscosity of the polyamide-6 melt.

An extraction was performed 16 h at 80° C. with 2400 l fresh water per hour for each 40 kg of each batch. The drying took place at 110° C. for 24 h in a vacuum.

The solution viscosity of extracted and dried polyamide-6 was determined in 0.5% by weight solution in m-cresol at 20° C.

The determination of the terminal group concentrations was carried out by means of acidimetric titration. The amino terminal groups were titrated in m-cresol/iso-propanol-2:1 (parts by weight) as solvent with 0.1-normal ethanolic perchloric acid. The titration of the carboxyl terminal groups took place in benzyl alcohol as solvent with 0.1-normal benzyl alcoholic potassium hydroxide.

In order to test their weather resistance the individual PA-6 types were subjected in the form of injection-molded tensile test bars 1 mm thick to the artificial weather test according to ASTM D2565 in a Weather-O-Meter of the type Ci35 of the Atlas company under the following conditions:

Radiation intensity at 340 nm wavelength: $0.35 W/m^2$

Cycle: 102/18 minutes

Temperature (Schwarztafel=black panel): 63±2° C.

According to the exposure times indicated in table 2 a sufficient number of tensile test bars were taken from each product and subjected to a mechanical testing. The measure for the weather resistance and resistance of the individual products to photo- and thermo-oxidative damage was the decrease of their tensile impact strength as the influence of weathering increased. The testing of the tensile impact strength was carried out according to DIN 53448 B1.2 (Jan. 1984) by means of a rapid tensile-strength testing machine of the REL type of the Zwick company at 23° C. and a speed of 4m/sec. The fact that a few of the products have a higher tensile impact strength after 50 hours weathering than in the initial state and retain this higher level in part over rather long times is traceable to the fact that the test specimens are periodically watered in the Weather-O-Meter and attain a higher toughness or tensile impact strength by the absorption of water per se.

The abbreviations used in the examples have the following meaning:

LC-6: Caprolactam

TPS: Terephthalic acid

AcOH: Acetic acid

NTE: Nitrilotriacetic acid

TAD: Triacetone diamine=4-amino-2,2,6,6-tetramethylpiperidine

DEAPA: 3-diethylamino-1-propylamine

BDHPPD: 3-(3,5-di-tert-butyl-4-hydroxyphenyl)-propionic acid

SZZ: Tensile impact strength at 23° C. measured according to DIN 53443 B1.2

(C): Carboxyl terminal group concentration in meq/kg (A): Amino terminal group concentration in meq/kg WOM: Weather-O-Meter RV: Relative solution viscosity in 0.5% solution in m-cresol at 20° C.

ber.: Calculated

Sources of supply of raw substances:

NTE: Fluka AG; Buchs (Switzerland)

TAD: Huls AG; Marl (Germany)

DEAPA: Fluka AG; Buchs (Switzerland)

DBHPP: Ciba Geigy AG; Basel (Switzerland)

EXAMPLES

The polyamide-6 types in accordance with the invention and the polyamide-6 types cited by way of comparison are characterized in table 1. All polymers contain multifunctional carboxylic acids as chain terminators with the exception of the product of reference example 1, which is chain-terminated with acetic acid. In order to create approximately the same conditions at the end of the polymerization in the case of multifunctional products regulated with carboxylic acids as concerns the polymerization rate, polymerization time and the average molecular weight, the amount of di- or tricarboxylic acid used in each instance was calculated so that the equilibrium water content at 260° C. for the unextracted products at a total terminal group concentration of 108.6 meq/kg is 0.153% by weight and for the extracted products at a total terminal group concentration of 120 meq/kg [is] 0.187% by weight. The portions extractable with water were estimated thereby at 9.5% by weight relative to unextracted product. The equilibrium constant for the PA-6 amide formation equilibrium weight at 260° C. was calculated at 403 from the data indicated by Ramesh et al. In Polymer, 1993, vol. 34, No. 8, p. 1716 ff.

TABLE 1

Characterization of the PA-6 in accordance with the invention and of the products of the state of the art (extracted and dried)

| Example | Raw substances (% by wt.) (45 kg LC-6 in each instance) | | | | | | | Analyses | | | |
|---------|------|------|-------|-------|-------|------|-------|-------|-----|-----|-----------|
| | LC-6 | AcOH | TPS | NTE | DBHPP | TAD | DEAPA | RV | [C] | [A] | ([C] - [A]) |
| | | | | | | | | | | | ber. |
| Vgl. 1 | 99.85 | 0.15 | — | — | | — | — | 1.795 | 52 | 23 | 28 |
| Vgl. 2[a)] | 99.412 | — | 0.38 | | 0.208 | — | — | 1.814 | 74 | 20 | 53.2 |
| Vgl. 3[b)] | 99.34 | — | 0.45 | | — | 0.21 | — | 1.807 | 70 | 40 | 30.8 |
| 1 | 99.374 | — | 0.417 | | 0.104 | 0.105 | — | 1.819 | 77 | 31 | 44.7 |
| 2 | 99.368 | — | 0.335 | | 0.104 | 0.105 | 0.88 | 1.805 | 62 | 46 | 17.3 |
| 3 | 99.387 | — | 0.195 | | 0.208 | 0.21 | — | 1.844 | 72 | 18 | 53.2 |
| | | | | | | | | | | | *) |
| 4 | 99.445 | — | — | 0.345 | — | 0.21 | — | 1.793 | 71 | 58 | 10.2 |
| 5 | 99.501 | — | — | 0.291 | 0.208 | — | — | 1.817 | 82 | 41 | 38.2 |
| 6 | 99.472 | — | — | 6.319 | 6.104 | 0.105 | — | 1.825 | 78 | 46 | 30.5 |
| 7 | 99.444 | — | — | 0.259 | 0.104 | 6.0.5 | 0.088 | 1.802 | 65 | 61 | 2.5 |

Key:
Vgl. = compare
ber. = calculated
[a)]according to DE-OS 2,237,849
[b)]according to DE-OS 4,413,177
*) Calculated
Examples 4 to 7 with nitrilotracetic acid

TABLE 2

Tensile impact strength of the products artificially weathered in the WOM

| | SZZ [kJ/m²] | | | | | | | | | |
|---|---|---|---|---|---|---|---|---|---|---|
| Weathering time [h] | Vgl. 1 | Vgl. 2 | Vgl. 3 | 1 | 2 | 3 | 4 | 5 | 6 | 7 |
| 0 | 850 | 640 | 850 | 780 | 820 | 750 | 790 | 760 | 800 | 780 |
| 50 | 350 | 750 | 900 | 850 | 870 | 770 | 850 | 800 | 760 | 820 |
| 120 | 20 | 430 | 540 | 800 | 770 | 740 | 440 | 410 | 730 | 710 |
| 250 | 10 | 320 | 30 | 470 | 480 | 750 | 20 | 350 | 420 | 450 |
| 300 | — | 10 | 30 | 340 | 360 | 730 | 20 | 20 | 320 | 350 |

Key:
Vgl. = compare

A comparison of Example 1 with reference examples 2 and 3 shows that the cooperation of components II and IV goes beyond a purely additive effect. The behavior of the PA-6 of example 3, which contains the double amount of II and IV, corroborates his finding, at least at a weathering time of 250 and 300 h. The results of the weathering tests with the products of examples 1 and 2 are practically identical. This is a documentation for the fact that the additional use of component III in example 2 has no significant influence on the weather resistance. Based on the data, no stabilizing action can be ascribed to the TPS either.

What is claimed is:

1. A method for producing a weather-resistant, aliphatic or partially aromatic, partially crystalline or amorphous polyamide comprising the steps:
   (a) providing a mixture comprising:
      (i) polyamide-forming monomers (component I);
      (ii) 0.02 to 0.7 percent by weight 4-amino-2,2,6,6,-tetraalkylpiperidine (component II);
      (iii) 0.0 to 0.5 percent by weight of a diamine selected from the group consisting of aliphatic diamines having at least a primary and at least a tertiary amino group and cycloaliphatic diamines having at least a primary and at least a tertiary amino group (component III); and
      (iv) 0.02 to 0.7 percent by weight of a 2,6-dialkylphenol (component IV) of the formula:

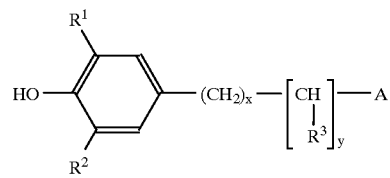

wherein:
      $R^1$ is an alkyl group having from 1 to 6 carbons;
      $R^2$ is an alkyl group having from 1 to 6 carbons and may be the same as or different from $R^1$
      $R^3$ is either hydrogen or $CH_3$; and
      A is selected from the group consisting of free carboxyl groups, carboxyl groups esterified with $C_1$–$C_4$ alcohols, and primary amino groups;
      and wherein where A is a free carboxyl group or a carboxyl group esterified with $C_1$–$C_4$ alcohols, x and y have the values x=2 when y=1, x=2 when y=0, x=1 when y =0 and x=0 when y=1, or x=0 when y=0;
      and wherein where A is a primary amino group, x and y have the values x=2 when y=1, x=2 when y=0, x=1 when y=0, or x=0 when y=1;

wherein the total amount of components II, III, and IV combined is 0.05 to 1.3 percent by weight of said mixture; and
   (b) polymerizing said mixture to form said polyamide.

2. A method for producing a weather-resistant, aliphatic or partially aromatic, partially crystalline or amorphous polyamide comprising the steps:
   (a) providing a mixture comprising:
      (i) polyamide-forming monomers (component I);
      (ii) 0.02 to 0.7 percent by weight 4-amino-2,2,6,6,-tetraalkylpiperidine (component II);
      (iii) 0.0 to 0.5 percent by weight of a diamine selected from the group consisting of aliphatic diamines having at least a primary and at least a tertiary amino group and cycloaliphatic diamines having at least a primary and at least a tertiary amino group (component III);
      (iv) 0.0 to 0.7 percent by weight of a 2,6-dialkylphenol (component IV) of the formula:

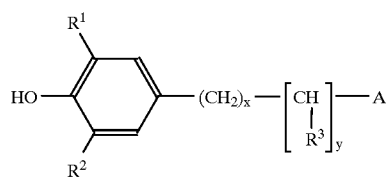

wherein:
      $R^1$ is an alkyl group having from 1 to 6 carbons;
      $R^2$ is an alkyl group having from 1 to 6 carbons and may be the same as or different from $R^1$
      $R^3$ is either hydrogen or $CH_3$; and
      A is selected from the group consisting of free carboxyl groups, carboxyl groups esterified with $C_1$–$C_4$ alcohols, and primary amino groups;
      and wherein where A is a free carboxyl group or a carboxyl group esterified with $C_1$–$C_4$ alcohols, x and y have the values x=2 when y=1, x=2 when y=0, x=1 when y=0 and x=0 when y=1, or x=0 when y=0;
      and wherein where A is a primary amino group, x and y have the values x=2 when y=1, x=2 when y=0, x=1; when y=0, or x=0 when y=1; and
   (v) 0.1 to 1.2 percent by weight of a carboxylic acid selected from the group consisting of tricarboxylic acids, tetracarboxylic acids, and polycarboxylic acids (component V);
   wherein the total amount of components II, III, IV, and V combined is 0.2 to 2.5 percent by weight of said mixture; and (b) polymerizing said mixture to form said polyamide.

3. The method according to claim 2, wherein said component V is selected from the group consisting of nitrilotriacetic acid, nitrilotripropionic acid, and trimethylnitriloiripropionic acid.

4. The method according to claim 1 or claim 2, wherein the amount of said component IX in said mixture is 0.03 to 0.6 percent by weight.

5. The method according to claim 1 or claim 2, wherein the amount of said component III in said mixture is 0.0 to 0.4 percent by weight.

6. The method according to claim 1, or claim 2, wherein the amount of said component IV in said mixture is 0.03 to 0.6 percent by weight.

7. The method according to claim 1 or claim 2, wherein the total amount of said components II, III, and IV in said mixture is 0.06 to 1.0 percent by weight.

8. The method according to claim 1 or claim 2, wherein in said component IV $R^1$ and $R^2$ are both $C(CH_3)_3$(t-butyl).

9. The method according to claim 1 or claim 2, wherein in said component IV, $R^1$ is t-butyl and is methyl.

10. The method according to claim 1 or claim 2, wherein said component II is 4-amino-2,2,6,6-tetramethylpiperidine.

11. The method according to claim 1 or claim 2, wherein in said component IV, $R^3$ is hydrogen, A is selected from the group consisting of —COOH, —COOCH$_3$, and —NH$_2$, x=2 and y=1.

12. The method according to claim 1 or claim 3, wherein the polyamide-forming monomers of component I are selected so as to be the monomers for a polyamide selected from the group consisting of polyamides 6, -11, -12, -66, -69, -610, -612, 61, and MXDA6.

13. The method according to claim 1 or claim 3, wherein the polyamide-forming monomers of component I are selected so as to be the monomers for a co-polyamide selected from the group consisting of co-polyamides 6/12, -6/66, -66/12, -6/66/12, -6/69, -6/610, -66/610, and 6T/61.

14. The method according to claim 1, the monomers of said component I are selected from the group consisting of lactams, ω-amino carboxylic acids, dicarboxylic acids, diamines, and salts thereof.

15. A weather-resistant, aliphatic or partially aromatic, partially crystalline or amorphous polyamide produced by polymerization of a mixture comprising:
    (a) polyamide-forming monomers (component I);
    (b) 0.02 to 0.7 percent by weight 4-amino-2,2,6,6,-tetraalkylpiperidine (component II);
    (c) 0.0 to 0.5 percent by weight of a diamine selected from the group consisting of aliphatic diamines having at least a primary and at least a tertiary amino group and cycloaliphatic diamines having at least a primary and at least a tertiary amino group (component III); and
    (d) 0.02 to 0.7 percent by weight of a 2,6-dialkylphenol (component IV) of the formula:

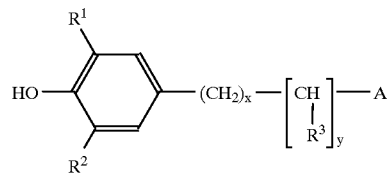

wherein:
   $R^1$ is an alkyl group having from 1 to 6 carbons;
   $R^2$ is an alkyl group having from 1 to 6 carbons and may be the same as or different from $R^1$
   $R^3$ is either hydrogen or $CH_3$; and
   A is selected from the group consisting of free carboxyl groups, carboxyl groups esterified with $C_1$–$C_4$ alcohols, and primary amino groups;
   and wherein where A is a free carboxyl group or a carboxyl group esterified with $C_1$–$C_4$ alcohols, x and y have the values x=2 when y=1, x=2 when y=0, x=1 when y=0 and x=0 when y=1, or x=0 when y=0;
   and wherein where A is a primary amino group, x and y have the values x=2 when y=1, x=2 when y=0, x=1 when y=0, or x=0 when y=1;
wherein the total amount of components II, III, and IV combined is 0.05 to 1.3 percent by weight of said mixture.

16. The polyamide according to claim 15, wherein said mixture further comprises:
    (e) 0.1 to 1.2 percent by weight of a carboxylic acid selected from the group consisting of tricarboxylic acids, tetracarboxylic acids, and polycarboxylic acids (component V).

17. The polyamide according to claim 16, wherein said component V is selected from the group consisting of nitrilotriacetic acid, nitrilotripropionic acid, and trimethylnitrilotripropionic acid.

18. The method of claim 1, further comprising the step:
    (c) subjecting said polyamide to a process selected from the group consisting of injection-molding and extrusion.

* * * * *